United States Patent
Ito

(10) Patent No.: US 10,503,449 B2
(45) Date of Patent: Dec. 10, 2019

(54) MOBILE TERMINAL THAT PERFORMS WIRELESS COMMUNICATION AND CONTROL METHOD FOR THE SAME

(71) Applicant: CANON KABUSHIKI KAISHA, Tokyo (JP)

(72) Inventor: Morikazu Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 15/334,584

(22) Filed: Oct. 26, 2016

(65) Prior Publication Data
US 2017/0123740 A1    May 4, 2017

(30) Foreign Application Priority Data

Oct. 30, 2015 (JP) ................. 2015-214567

(51) Int. Cl.
*G06F 3/12* (2006.01)
*H04N 1/00* (2006.01)

(52) U.S. Cl.
CPC .......... *G06F 3/1236* (2013.01); *G06F 3/1205* (2013.01); *G06F 3/1292* (2013.01); *H04N 1/00307* (2013.01); *H04N 1/00413* (2013.01); *H04N 2201/0055* (2013.01); *H04N 2201/0075* (2013.01); *H04N 2201/0094* (2013.01)

(58) Field of Classification Search
USPC .................................. 358/1.1–3.29
See application file for complete search history.

(56) References Cited

U.S. PATENT DOCUMENTS

| | | | | |
|---|---|---|---|---|
| 2007/0213008 A1* | 9/2007 | Lee | ........................ | H04B 7/02 455/41.2 |
| 2013/0057898 A1* | 3/2013 | Park | ...................... | H04L 63/10 358/1.14 |
| 2013/0128311 A1* | 5/2013 | Kim | ..................... | G06F 3/1296 358/1.15 |
| 2014/0092413 A1* | 4/2014 | Shibata | ............. | H04N 1/00204 358/1.13 |

(Continued)

FOREIGN PATENT DOCUMENTS

| | | |
|---|---|---|
| JP | 2006157680 A | 6/2006 |
| JP | 2008228271 A | 9/2008 |

(Continued)

OTHER PUBLICATIONS

Office Action issued in Japanese Application No. 2015-214567 dated Sep. 3, 2019.

(Continued)

*Primary Examiner* — Marcellus J Augustin
(74) *Attorney, Agent, or Firm* — Rossi, Kimms & McDowell LLP

(57) ABSTRACT

A mobile terminal with which an intended image forming apparatus can be easily paired is provided. A search unit searches for an image forming apparatus. A display unit displays, as a result of searching by the search unit, a list containing a plurality of image forming apparatuses. A specifying unit specifies, from the plurality of image forming apparatuses, one image forming apparatus to which the mobile terminal is brought closer. A connection unit connects to the image forming apparatus specified by the specifying unit.

25 Claims, 11 Drawing Sheets

(56) References Cited

U.S. PATENT DOCUMENTS

| | | | | |
|---|---|---|---|---|
| 2014/0096202 A1* | 4/2014 | Matsuda | ............... | H04W 4/008 |
| | | | | 726/4 |
| 2014/0240768 A1 | 8/2014 | Kimura | | |
| 2016/0006902 A1* | 1/2016 | Okamoto | ........... | H04N 1/00342 |
| | | | | 358/1.13 |
| 2016/0360477 A1* | 12/2016 | Saeki | ........................ | B41J 29/00 |
| 2019/0116287 A1* | 4/2019 | Hosoda | ................. | G06F 3/1203 |

FOREIGN PATENT DOCUMENTS

| | | | |
|---|---|---|---|
| JP | 2012138074 A | 7/2012 | |
| JP | 2013146048 A | 7/2013 | |
| JP | 2014072768 A | 4/2014 | |
| JP | 2014165594 A | 9/2014 | |
| JP | 2015504561 A | 2/2015 | |
| JP | 2015045972 A | 3/2015 | |
| JP | 2015142163 A | 8/2015 | |
| KR | 101318013 B1 | 10/2013 | |
| WO | 2015156014 A1 | 10/2015 | |

OTHER PUBLICATIONS

Office Action issued in Korean Appln. No. 10-2016-0137507 dated Sep. 26, 2019.

* cited by examiner

|  | 0.1 m | 1 m | 1.8 m | 3.3 m | 5.6 m | 10 m |
|---|---|---|---|---|---|---|
| MOBILE TERMINAL A | -20 | -40 | -45.11 | -50.37 | -54.96 | -60 |
| MOBILE TERMINAL B | -25 | -45 | -50.11 | -55.37 | -59.96 | -65 |
| MOBILE TERMINAL C | -30 | -50 | -55.11 | -60.37 | -64.96 | -70 |

(UNIT: dBm)

MOBILE TERMINAL THAT PERFORMS WIRELESS COMMUNICATION AND CONTROL METHOD FOR THE SAME

BACKGROUND OF THE INVENTION

Field of the Invention

The present invention relates to a mobile terminal that performs wireless communication and a control method for the mobile terminal.

Description of the Related Art

Regarding image forming apparatuses such as a multi-function peripheral and a printer, more apparatuses have been equipped with a wireless communication function by using a wireless LAN, Bluetooth (registered trademark), or the like in recent years. A user performs pairing between such an image forming apparatus and a mobile terminal, based on information contained in wireless communication information, for example, a radio wave strength; and then the user performs, through the mobile terminal, various processes such as printing. In general, the radio wave strength in wireless communication has a characteristic that a radio wave attenuates reverse-proportional to a square of a communication distance; thus, it is possible to estimate a distance between the mobile terminal and the image forming apparatus from the radio wave strength received by the mobile terminal from the image forming apparatus.

By using this attenuation characteristic of a radio wave strength, in some cases, an image forming apparatus specifies the closest mobile terminal, based on distances to mobile terminals estimated from radio wave strengths detected by a near-field wireless communication, and performs pairing with the closest mobile terminal (for example, see Japanese Laid-Open Patent Publication (kokai) No. 2013-146048).

Further, when a mobile terminal performs wireless communication with a plurality of image forming apparatuses, there are a plurality of radio waves in a space. Therefore, in some cases, the mobile terminal receives, from the image forming apparatuses, not only one but a plurality of radio waves containing, for example, advertisement information which contains information from which the image forming apparatuses can be specified. In such a case, the mobile terminal displays, on a user interface of the mobile terminal, a list of the plurality of image forming apparatuses corresponding to the received radio waves which contain advertisement information (for example, Japanese Laid-Open Patent Publication (kokai) No. 2014-165594).

However, in general, the advertisement information contains only a little information, and the user interface can display only a device name of each image forming apparatus corresponding to each piece of advertisement information. Therefore, it is difficult for the user of the mobile terminal to determine which one in the list of device names displayed on the user interface corresponds to the image forming apparatus with which the user really wants to pair the mobile terminal, and it is not easy to pair the mobile terminal with the intended image forming apparatus.

SUMMARY OF THE INVENTION

The present invention provides a mobile terminal with which an intended image forming apparatus can be easily paired, and a control method for the mobile terminal.

Accordingly, the present invention provides a mobile terminal comprising a search unit configured to search for an image forming apparatus, a display unit configured to display, as a result of searching by the search unit, a list containing a plurality of image forming apparatuses, a specifying unit configured to specify, from the plurality of image forming apparatuses, one image forming apparatus to which the mobile terminal is brought closer, and a connection unit configured to connect to the image forming apparatus specified by the specifying unit.

According to the present invention, it is possible to easily pair the mobile terminal with the intended image forming apparatus.

Further features of the present invention will become apparent from the following description of exemplary embodiments (with reference to the attached drawings).

DESCRIPTION OF THE EMBODIMENTS

Hereinafter, an embodiment of the present invention will be described in detail with reference to the drawings.

Figure 1:
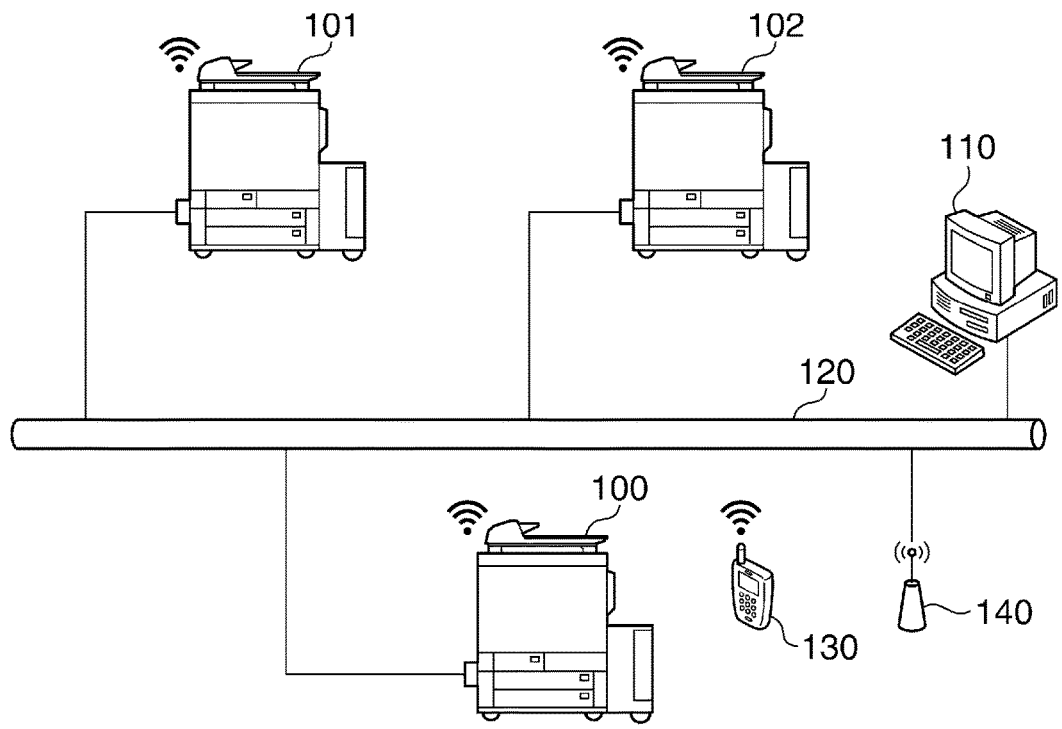
FIG. 1 is a diagram showing a configuration of a printing system including a mobile terminal and image forming apparatuses according to a first embodiment of the present invention.

FIG. 1 is a diagram showing a configuration of a printing system including a mobile terminal and image forming apparatuses according to a first embodiment of the present invention.

With reference to FIG. 1, the printing system is equipped with image forming apparatuses 100, 101, and 102, a PC 110, and an access point 140. The image forming apparatuses 100, 101, and 102 are connected to a network 120 and can communicate with external devices such as the PC 110 and a mobile terminal 130 through the network 120. Further, the image forming apparatuses 100, 101, and 102 are each equipped with a wireless function and send a radio wave for a radio system using a wireless LAN or Bluetooth. The PC 110 transmits print data to the image forming apparatuses 100, 101, and 102 through the network 120.

The mobile terminal 130 connects through the access point 140 or directly to the image forming apparatuses 100, 101, and 102 and transmits print data to the image forming apparatuses 100, 101, and 102. Further, the mobile terminal 130 receives a plurality of radio waves sent from the image forming apparatuses 100, 101, and 102 and analyzes contents of the radio waves so as to perform various processes. The image forming apparatuses 100, 101, and 102 receive the print data from the PC 110 or the mobile terminal 130 and then perform a printing process, based on the received print data. In the following, a description about the image forming apparatus will be given on the image forming apparatus 100.

Figure 2:
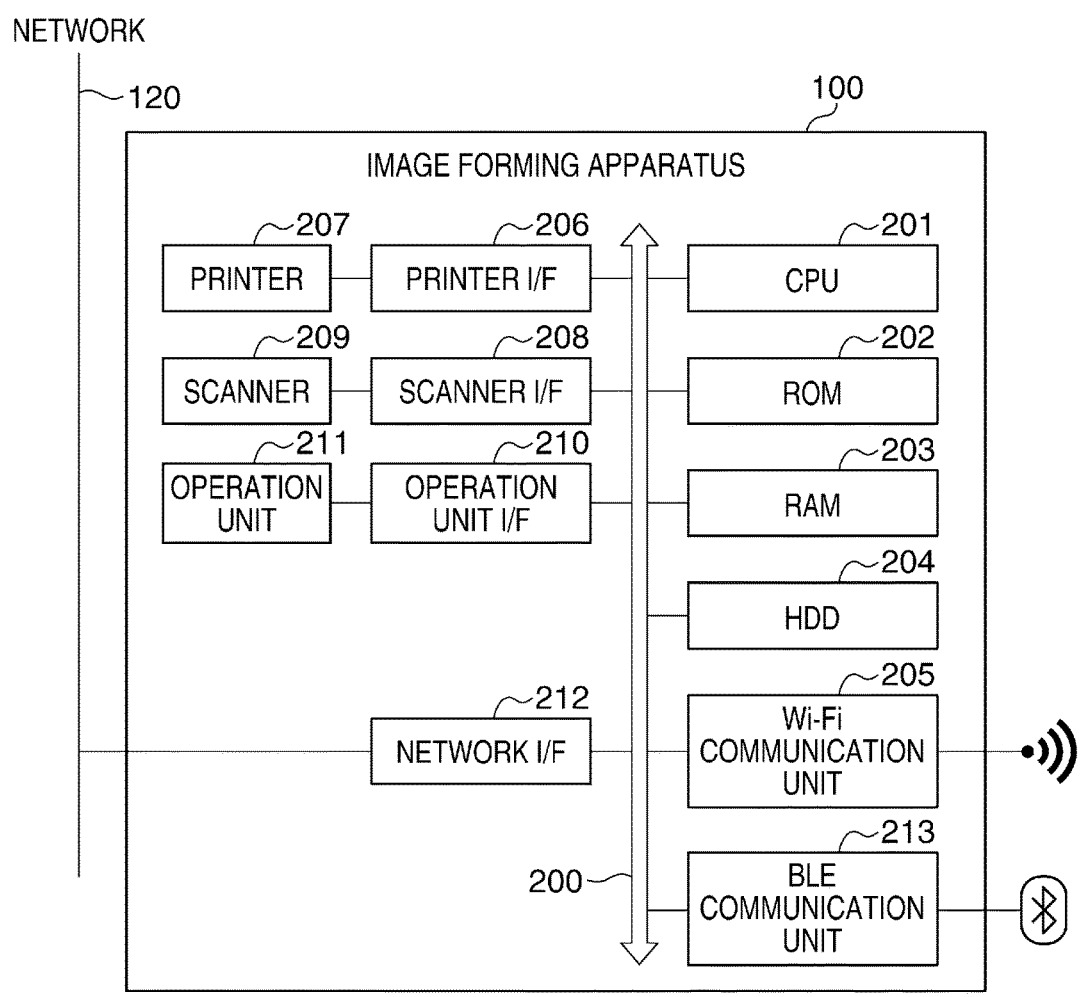
FIG. 2 is a block diagram schematically showing a configuration of the image forming apparatus in FIG. 1.

FIG. 2 is a block diagram schematically showing a configuration of the image forming apparatus 100 in FIG. 1. It should be noted that although the image forming apparatus 100 is assumed as a multifunction peripheral in the present embodiment, the image forming apparatus 100 may be a printer or the like, which is not equipped with a scanner function.

The image forming apparatus 100 is equipped with a CPU 201, ROM 202, RAM 203, an HDD 204, and a Wi-Fi communication unit 205. Further, the image forming apparatus 100 is equipped with a printer I/F 206, a scanner I/F 208, an operation unit I/F 210, a network I/F 212, and a BLE (Bluetooth low energy) communication unit 213. These components are connected to one another through a bus 200. Further, the image forming apparatus 100 is equipped with a printer 207, a scanner 209, and an operation unit 211, and these components are respectively connected to the bus 200 through the printer I/F 206, the scanner I/F 208, and the operation unit I/F 210. The network I/F 212 connects the image forming apparatus 100 and the network 120.

The CPU 201 totally controls the image forming apparatus 100 and executes various control programs stored in the ROM 202 to perform various processes for controlling an operation of the image forming apparatus 100. The RAM 203 is a volatile memory and is used as a main memory and a work area of the CPU 201 or a temporary storage area for various data. The HDD 204 is a non-volatile memory and stores various data such as print data or a scan image which are used by the CPU 201. It should be noted that although the CPU 201 alone performs various processes in the image forming apparatus 100, a plurality of CPUs may cooperate to perform various processes. The Wi-Fi communication unit 205 performs wireless communication, with the mobile terminal 130, by a radio system using a wireless LAN. The wireless communication performed by the Wi-Fi communication unit 205 is performed directly between the image forming apparatus 100 and the mobile terminal 130 without passing through a relay device such as the access point 140, in some cases.

The BLE communication unit 213 performs wireless communication, with the mobile terminal 130, by the radio system using the BLE (hereinafter, referred to as "BLE wireless communication"). Further, the BLE communication unit 213 measures strength of a radio wave received from the mobile terminal 130 during the BLE wireless communication and estimates a distance to the mobile terminal 130, based on the measured strength. The scanner 209 reads a document to generate a scan image. The printer 207 performs a printing process on a sheet, based on print data received from an external device, the scan image generated by the scanner 209, or the like. The scan image printed by the printer 207 is stored in the HDD 204. The operation unit 211 is equipped with a liquid crystal display unit having a touch panel function and a keyboard, and displays various operation screens. A user inputs instructions and information into the image forming apparatus 100 through the operation unit 211. The network I/F 212 is connected to the network 120 and performs communication with the external devices on the network 120. Further, the network I/F 212 receives print data from an external device, and the printer 207 performs a printing process, based on the print data.

Figures 3, 4:
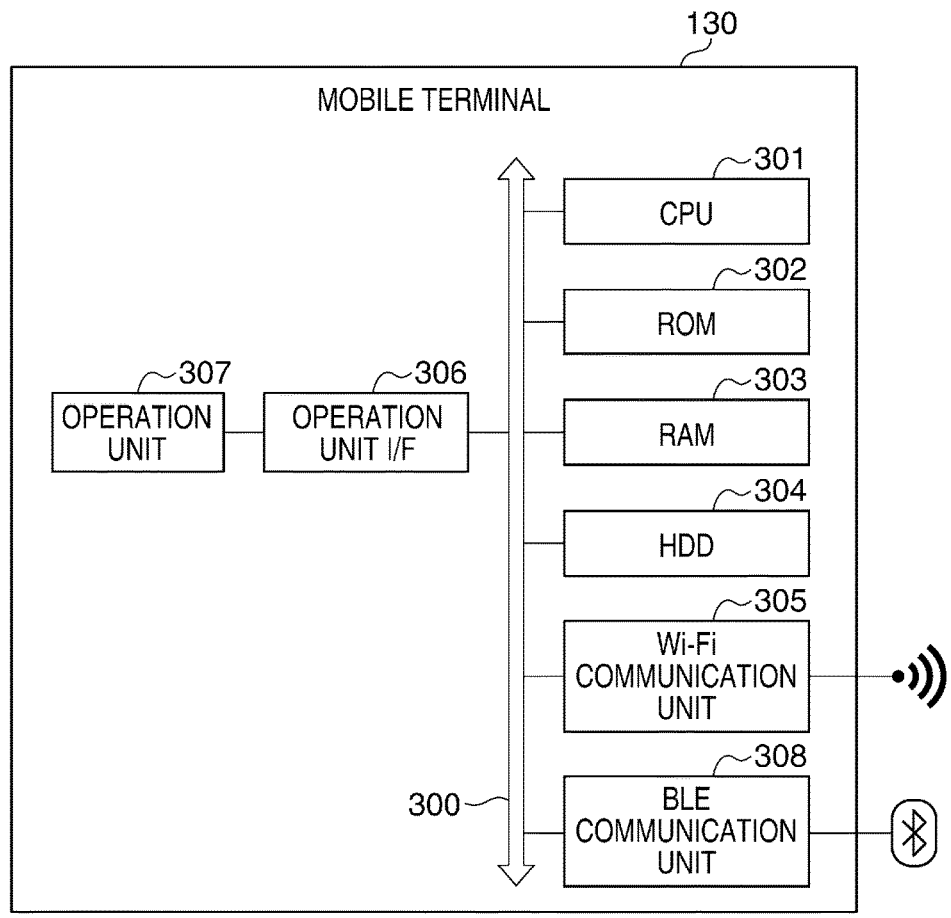
FIG. 3 is a block diagram schematically showing a configuration of the mobile terminal in FIG. 1.
FIG. 4 is a diagram for describing a relationship between a radio wave strength and a distance between the mobile terminal and the image forming apparatus.

FIG. 3 is a block diagram schematically showing a configuration of the mobile terminal 130 in FIG. 1.

The mobile terminal 130 is equipped with a CPU 301, ROM 302, a RAM 303, an HDD 304, a Wi-Fi communication unit 305, an operation unit I/F 306, and a BLE communication unit 308, and these components are connected to one another through a bus 300. Further, the mobile terminal 130 is equipped with an operation unit 307, and the operation unit 307 is connected to the bus 300 through the operation unit I/F 306.

THE CPU 301 reads out various control programs stored in the ROM 302 and performs various processes for controlling an operation of the mobile terminal 130. The RAM 303 is a volatile memory and is used as a main memory and a work area of the CPU 301 or a temporary storage area for various data. The HDD 304 is a non-volatile memory and stores various data such as an image. The Wi-Fi communication unit 305 performs wireless communication, with the image forming apparatus 100, by a radio system using a wireless LAN. The wireless communication performed by the Wi-Fi communication unit 305 is performed directly between the mobile terminal 130 and the image forming apparatus 100 without passing through a relay device such as the access point 140, in some cases. The BLE communication unit 308 performs BLE wireless communication with the image forming apparatus 100. Further, the BLE communication unit 308 measures strength of the radio wave received, from the image forming apparatus 100, in the BLE wireless communication, and the BLE communication unit 308 estimates a distance to the image forming apparatus 100, based on the measured strength. It should be noted that because the strength of the radio wave is reverse-proportional to the distance as shown in FIG. 4, the distance between the mobile terminal 130 and the image forming apparatus 100 is closer when the strength of the radio wave received by the mobile terminal 130 is higher. The operation unit 307 is equipped with a liquid crystal display unit having a touch panel function and a keyboard, and displays various operation screens. A user inputs instructions and information into the mobile terminal 130 through the operation unit 307.

Figure 5:
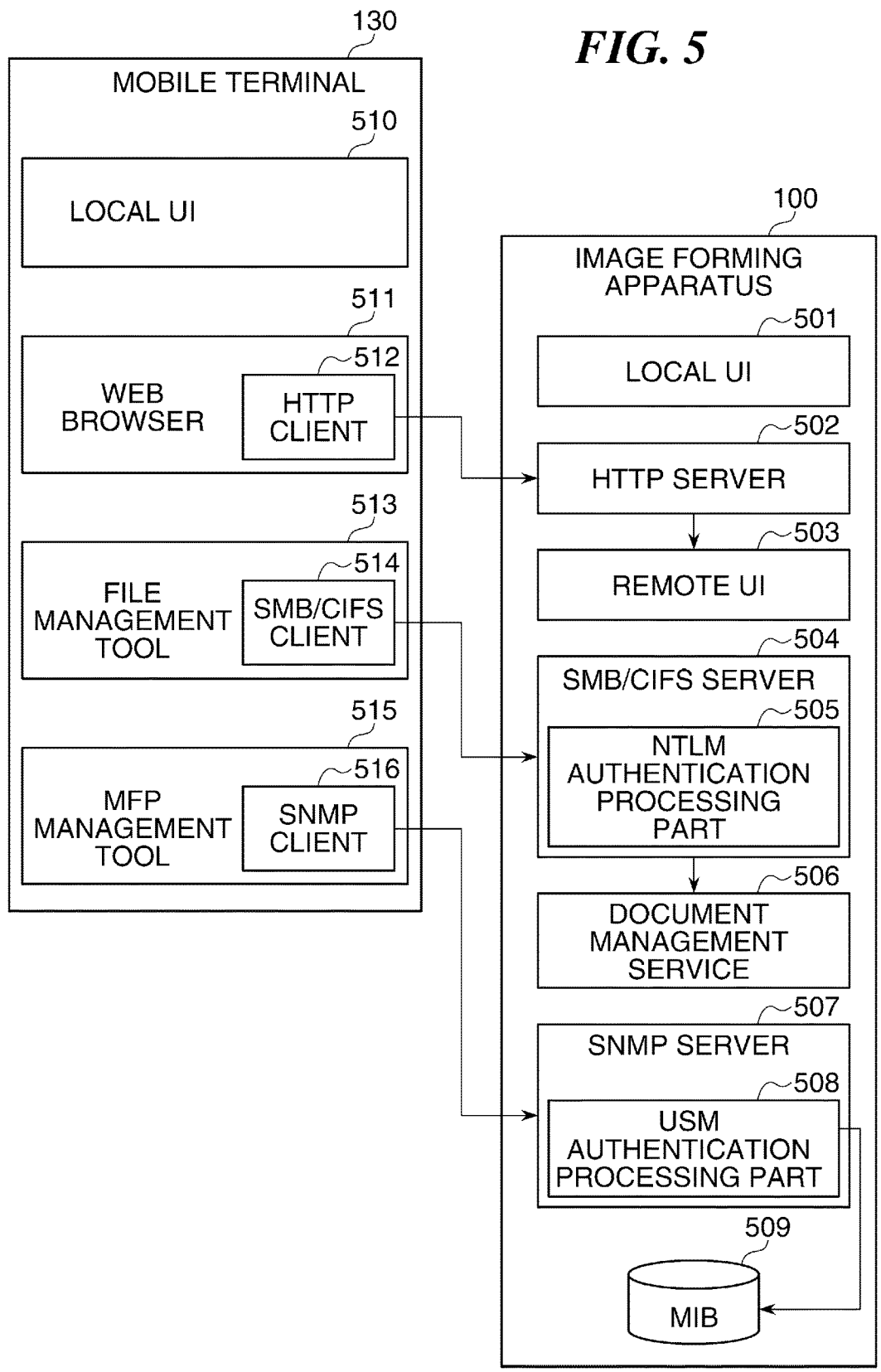
FIG. 5 is a block diagram schematically showing configurations of software of the mobile terminal and the image forming apparatus of FIG. 1 and schematically showing configurations of data managed by the software.

FIG. 5 is a block diagram schematically showing configurations of software of the mobile terminal 130 and the image forming apparatus 100 of FIG. 1 and schematically showing configurations of data managed by the software. Each arrow of FIG. 5 represents the relationship between a source and a destination of a function call.

The image forming apparatus 100 includes as software a local UI 501, an HTTP server 502, a remote UI 503, an SMB/CIFS server 504, a document management service 506, an SNMP server 507, and an MIB 509.

The mobile terminal 130 includes as software a local UI 510, a web browser 511, a file management tool 513, and an MFP management tool 515. The local UI 510 displays on the operation unit 307 a user interface which is operable by a user so as to provide the user with the functions of the mobile terminal 130. For example, by using the user interface displayed by the local UI 510, the user can confirm device information of the image forming apparatus 100 contained in the radio wave received from the image forming apparatus 100 through the BLE communication unit 308. The web browser 511 is equipped with an HTTP client 512 as a function for communicating with the HTTP server 502 of the image forming apparatus 100. The file management tool 513 is equipped with an SMB/CIFS client 514 as a function for communicating with the SMB/CIFS server 504 of the image forming apparatus 100. The MFP management tool 515 is equipped with an SNMP client 516 as a function for accessing the MIB 509 through the SNMP server 507 of the image forming apparatus 100.

On the image forming apparatus 100, the local UI 501 displays on the operation unit 211 a user interface which is operable by the user so as to provide the user with the functions of the image forming apparatus 100. The HTTP server 502 calls the remote UI 503, based on a request from the web browser 511 of the mobile terminal 130. The remote UI 503 provides a user interface written in HTML to the HTTP server 502 for the user operating the web browser 511 of the mobile terminal 130. Further, the HTTP server 502 transmits the HTML obtained from the remote UI 503 to the web browser 511 as a response to the request from the web browser 511 of the mobile terminal 130. The SMB/CIFS server 504 is equipped with an NTLM authentication processing part 505 which processes an NTLM (Windows NT LAN Manager) authentication protocol. The SMB/CIFS server 504 calls the document management service 506 upon receiving, from the file management tool 513 of the mobile terminal 130, a request for browsing or saving files or other processes. The document management service 506 performs browsing and updating of electric documents (files having an extension PDF, JPEG, PNG, DOC, or the like) stored in the HDD 204, saving a new file in the HDD 204, and other processes. The SNMP server 507 is equipped with a USM authentication processing part 508 which performs a user authentication protocol defined by USM (User-based Security Model) of SNMP version 3. Further, upon receiving an access from the SNMP client 516 of the mobile terminal 130, the SNMP server 507 references and sets data stored in the MIB 509.

Figure 6A:
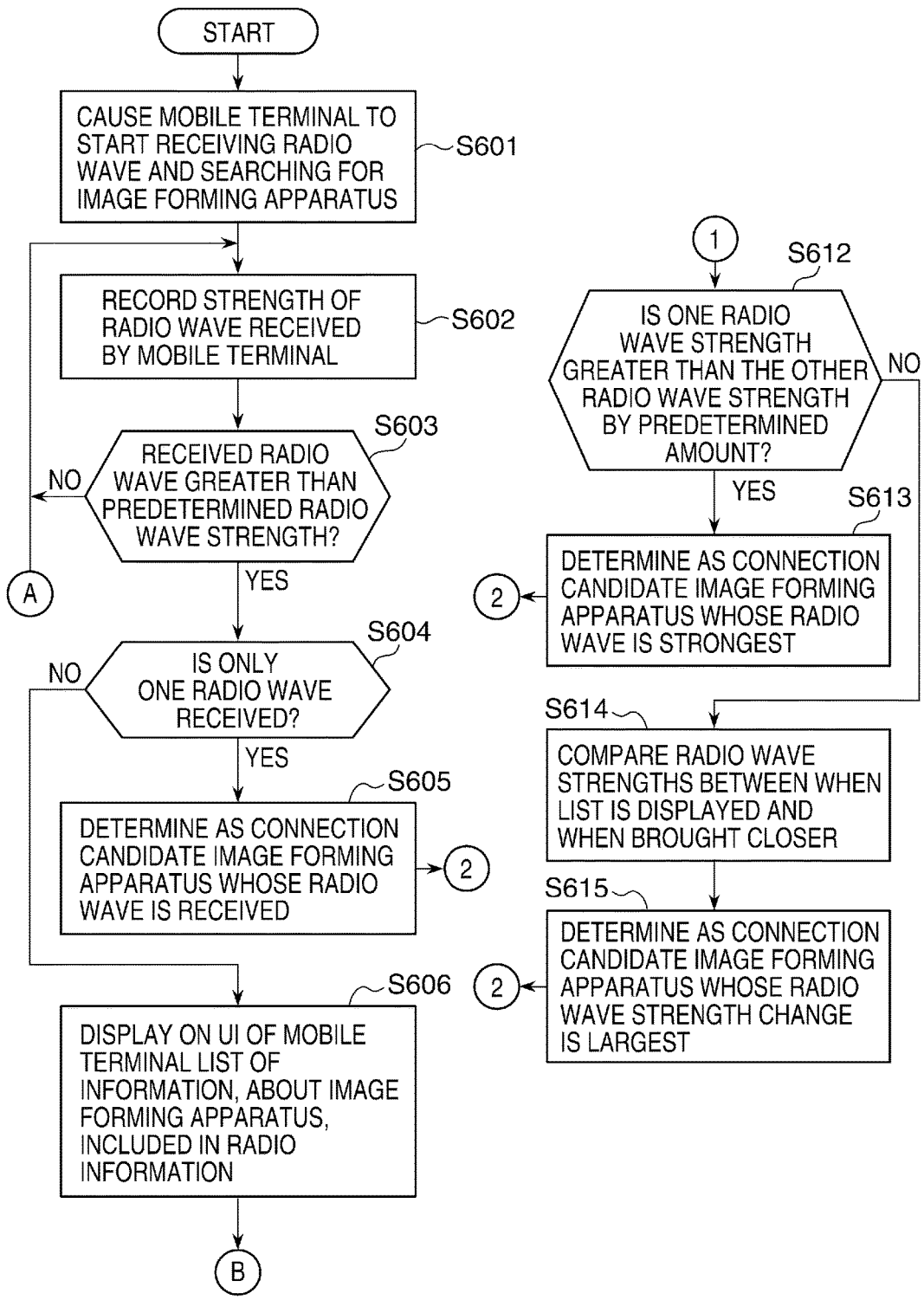
FIG. 6A and FIG. 6B are flowcharts showing procedures of an image forming apparatus determination process performed on the mobile terminal of FIG. 3.
Figure 6B:
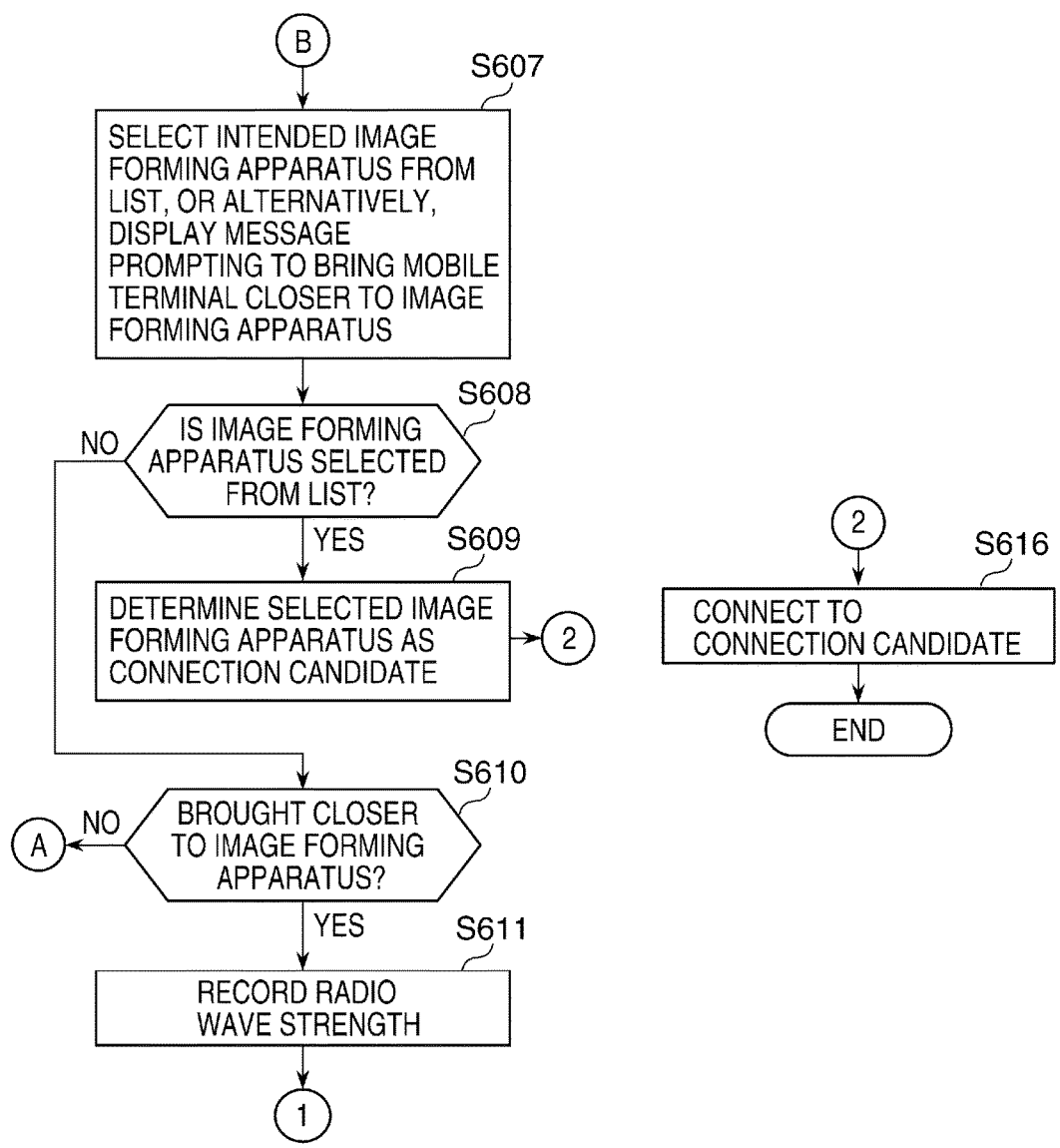

FIG. 6A and FIG. 6B are flowcharts showing procedures of an image forming apparatus determination process performed on the mobile terminal 130 of FIG. 3. The process of FIG. 6A and FIG. 6B is realized by the CPU 301 reading out and executing a program stored in the RAM 303.

With reference to FIG. 6A, first, the CPU 301 causes the BLE communication unit 308 to start BLE wireless communication to start searching for a connectible image forming apparatus (step S601). If the BLE communication unit 308 receives a radio wave from at least one of a plurality of image forming apparatuses, the CPU 301 records a strength of the received radio wave in the RAM 303 (step S602). Next, the CPU 301 determines whether the strength of the radio wave received in step S602 is greater than a previously set predetermined value (step S603). The predetermined value is −60 dBm, for example. If the result of the determination in step S603 shows that the strength of the received radio wave is not greater than the predetermined value (step S603: NO), the process returns to step S602. On the other hand, if the result of the determination in step S603 shows that the strength of the received radio wave is greater than the predetermined value (step S603: YES), the CPU 301 determines whether the number of the radio waves received by the BLE communication unit 308 is one (step S604).

Figure 7:
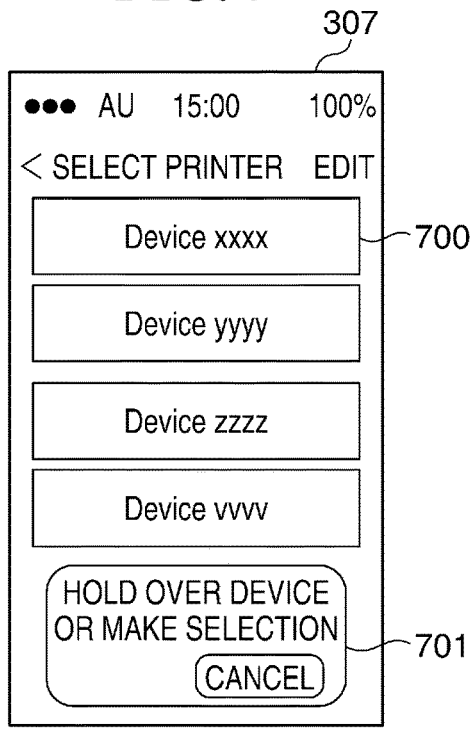
FIG. 7 is a diagram showing an example of a list of device names of image forming apparatuses and a message to a user both displayed on an operation unit of the mobile terminal.

If the result of the determination in step S604 shows that the number of the received radio waves is one (step S604: YES), the CPU 301 determines as a connection candidate the image forming apparatus sending the radio wave (step S605) and advances the process to step S616 to be described later. On the other hand, the result of the determination in step S604 shows that the number of the received radio waves is greater than one (step S604: NO), the CPU 301 displays device names of the image forming apparatuses on the operation unit 307, based on information contained in the plurality of received radio waves (step S606). The device names of the image forming apparatuses are displayed on the operation unit 307, as a list, for example, a list 700 shown in FIG. 7.

Figure 8:
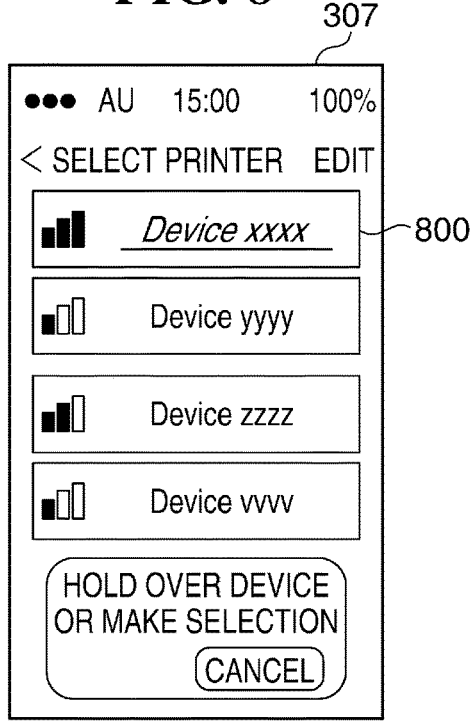
FIG. 8 is a diagram showing another example of the list of device names of image forming apparatuses and a message to a user both displayed on the operation unit of the mobile terminal.

Subsequently, the CPU 301 displays, for the user, a message 701 (FIG. 7) on the operation unit 307 (step S607). The message 701 prompts the user to select, from the list 700, the image forming apparatus to which connection is intended, or to bring the mobile terminal 130 closer to the image forming apparatus to which connection is intended (to move the mobile terminal 130 toward the image forming apparatus). It should be noted that by the user moving to the image forming apparatus to which connection is intended and holding the mobile terminal 130 over the image forming apparatus, the mobile terminal 130 is brought closer to the image forming apparatus to which connection is intended. Then, the CPU 301 determines whether an image forming apparatus is selected, by the user, from the list 700 displayed on the operation unit 307 of the mobile terminal 130 (step S608). The determination is made based on an action of the user tapping any one of the device names of the image forming apparatuses displayed in the list 700. It should be noted that in order to help the user select an image forming apparatus, it is also possible to display not only the device names shown in FIG. 7 but also the strengths of the radio waves, alongside the device names as shown in the list 800 of FIG. 8. Further, it is also possible to highlight the device name of the image forming apparatus which is most likely to be selected (whose radio wave is strongest) by using a different font or a different font size.

If the result of the determination in step S608 shows that the device name of one image forming apparatus is selected from the list 700 (step S608: YES), the CPU 301 determines the selected image forming apparatus as the connection candidate (step S609). Then, the CPU 310 advances the process to step S616. On the other hand, if the result of the determination in step S608 shows that an image forming apparatus is not selected from the list 700 (step S608: NO), the CPU 301 determines whether the mobile terminal 130 is brought, by the user, closer to the image forming apparatus to which connection is intended (step S610). It should be noted that steps S601 to S609 are performed before the user brings the mobile terminal 130 closer to the image forming apparatus to which connection is intended. Specifically, the recording of the strengths of the radio waves received in step S602 and the displaying of the list of the device names of the image forming apparatuses in step S607 are both performed before the mobile terminal 130 is brought closer to the image forming apparatus to which connection is intended.

If the result of the determination in step S610 shows that the mobile terminal 130 is brought closer to the image forming apparatus to which connection is intended (step S610: YES), the CPU 301 receives the radio waves again from connectible image forming apparatuses by using the BLE communication unit 308. Further, the CPU 301 records the strengths of the received radio waves in the RAM 303 (step S611). Specifically, the CPU 301 records the strengths of the radio waves received after the mobile terminal 130 is brought closer to the image forming apparatus to which connection is intended (after the user moves). On the other hand, if the mobile terminal 130 is not brought closer to the image forming apparatus to which connection is intended (step S610: NO), the process returns to step S602. It should be noted that in step S610, based on whether the strength of at least one radio wave has changed, it is determined whether the mobile terminal 130 is brought closer to the image forming apparatus to which connection is intended. Next, the CPU 301 determines whether one of the strengths of the radio waves received in step S611 is greater than the strengths of the other radio waves by a predetermined amount (step S612). The predetermined amount is 20 dBm, for example.

If the result of the determination in step S612 shows that the strength of one radio wave is greater than the strengths of the other radio waves by the predetermined amount (step S612: YES), the CPU 301 determines as a connection candidate the image forming apparatus sending the one radio wave (step S613). Subsequently, the CPU 301 advances the process to step S616. On the other hand, if the result of the determination in step S612 shows that there is no radio wave whose strength is greater than the other radio waves by the predetermined amount (step S612: NO), the CPU 301 compares the amounts of change in strength of the received waves with each other. Specifically, the CPU 301 calculates the amounts of change between the strengths of the radio waves recorded in step S602 and the strengths of the radio waves recorded in step S611, and then compares the amounts of change with each other (step S614). Here, the amounts of change correspond to the amounts of change in radio wave strength from when the list of the device names of the image forming apparatuses is displayed to when the user moves to the image forming apparatus to which connection is intended.

Further, based on the comparison in step S614, the CPU 301 determines as a connection candidate the image forming apparatus sending the radio wave having the largest amount of change in strength of the calculated amounts of change in strength (step S615), and the CPU 301 advances the process to step S616. Then, in step S616, the CPU 301 makes a connection to the image forming apparatus determined as the connection candidate by the radio system using Wi-Fi, and then finishes this process. It should be noted that it is also possible that steps S612 and S613 are skipped after performing step S611 and that the following steps S614 to S616 are performed.

By the above-described process of FIG. 6A and FIG. 6B, in the case that radio waves are received from a plurality of image forming apparatuses, the image forming apparatus as the connection candidate is determined based on the amounts of change in strength recorded in step S602 and step S611. Therefore, the user does not necessarily need to select from the list 700 the image forming apparatus to which connection is intended. Further, the image forming apparatus as the connection candidate is determined based on the amounts of change in strength of the radio waves between when the list of the device names of the image forming apparatuses is displayed as the list 700 and when the mobile terminal 130 is brought closer to the image forming apparatus to which connection is intended (the period from step S602 to step S611). Specifically, the image forming apparatus sending the radio wave having the largest amount of change in strength is determined as the connection candidate. Because the user gets closest to the image forming apparatus to which connection is intended, the amount of change in strength of the radio wave sent from the image forming apparatus to which connection is intended is the largest compared with the amounts of change in strength of the radio waves sent from the other image forming apparatus. Thus, the intention of the user is reflected on the amount of change of the radio wave, and as a result, the intension of the user can be reflected to the determination of the image forming apparatus as the connection candidate. As a result, it can be easy to perform pairing with the intended image forming apparatus.

It should be noted that in the present embodiment, it is also possible to estimate the distances between the image forming apparatuses and the mobile terminal device, from the amounts of radio wave change in strength. Specifically, it is determined that the image forming apparatus having the largest amount of change in radio wave strength is the closest image forming apparatus. This method makes it easy to determine the closest image forming apparatus.

Further, in the present embodiment, it is possible to determine the image forming apparatus to which connection is intended not only by the user bringing the mobile terminal 130 close to the image forming apparatus in response to the display of the message 701 but also by selecting an image forming apparatus from the list 700. This method can increase the number of the methods of determining the image forming apparatus as the connection candidate and can thus improve users' convenience.

Further, in the present embodiment, it is also possible to highlight, in the list 700, the information on the image forming apparatus sending the radio wave having the strongest strength. By this display, it is easy for users to specify the closest image forming apparatus.

In the first embodiment, the image forming apparatus sending the radio wave having the largest amount of change in strength is determined as the connection candidate. In contrast to that arrangement, in the second embodiment, the image forming apparatus as the connection candidate is determined based on the difference between the amounts of change in strength of the radio wave sent from each of the image forming apparatuses. It should be noted that in the present embodiment, the same parts as in the above first embodiment are assigned the same reference symbols and will not be described again, and only points different from those in the above first embodiment will be described.

Figure 9A:
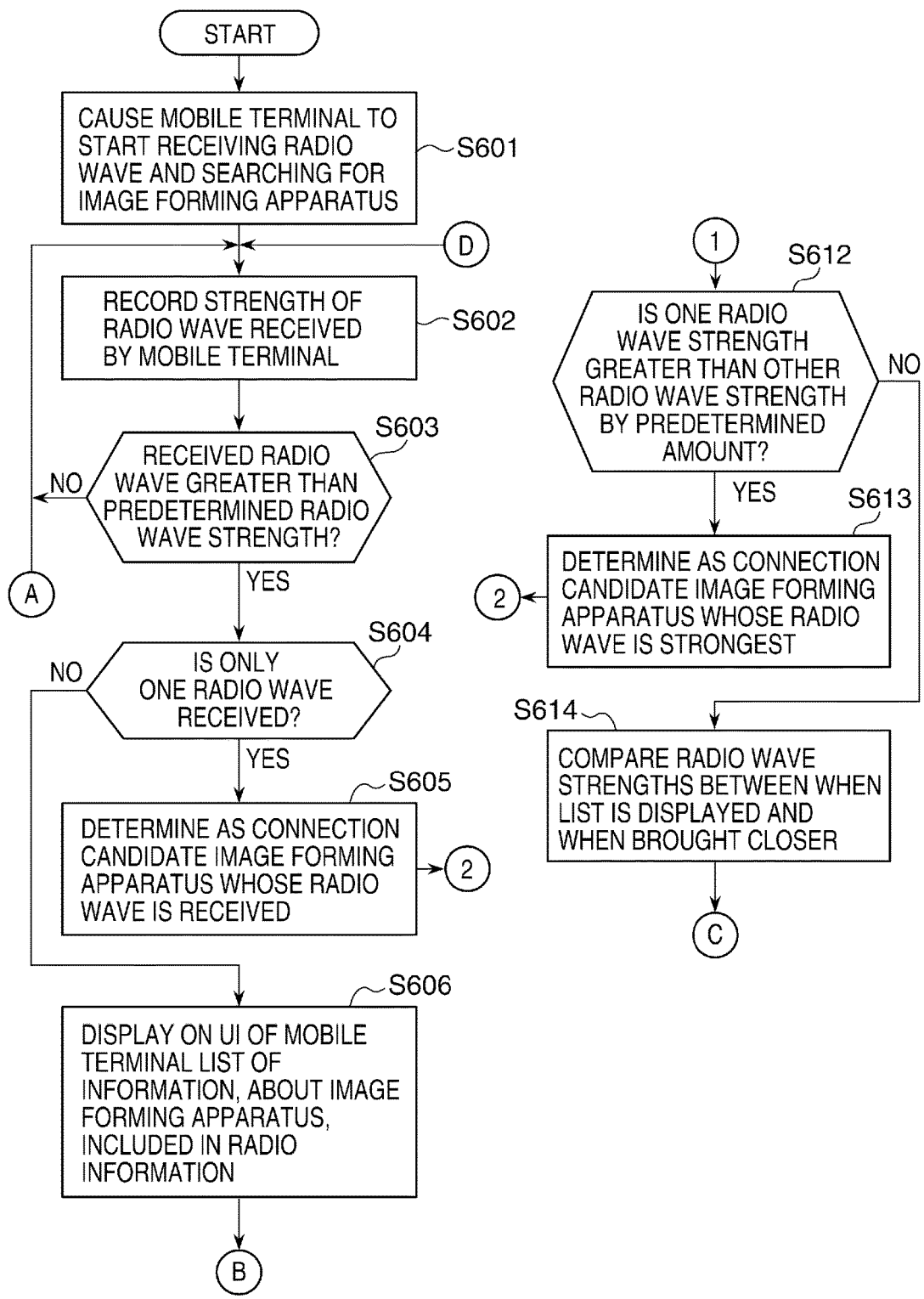
FIG. 9A and FIG. 9B are a flowchart showing procedures of another image forming apparatus determination process performed on the mobile terminal of FIG. 3.
Figure 9B:
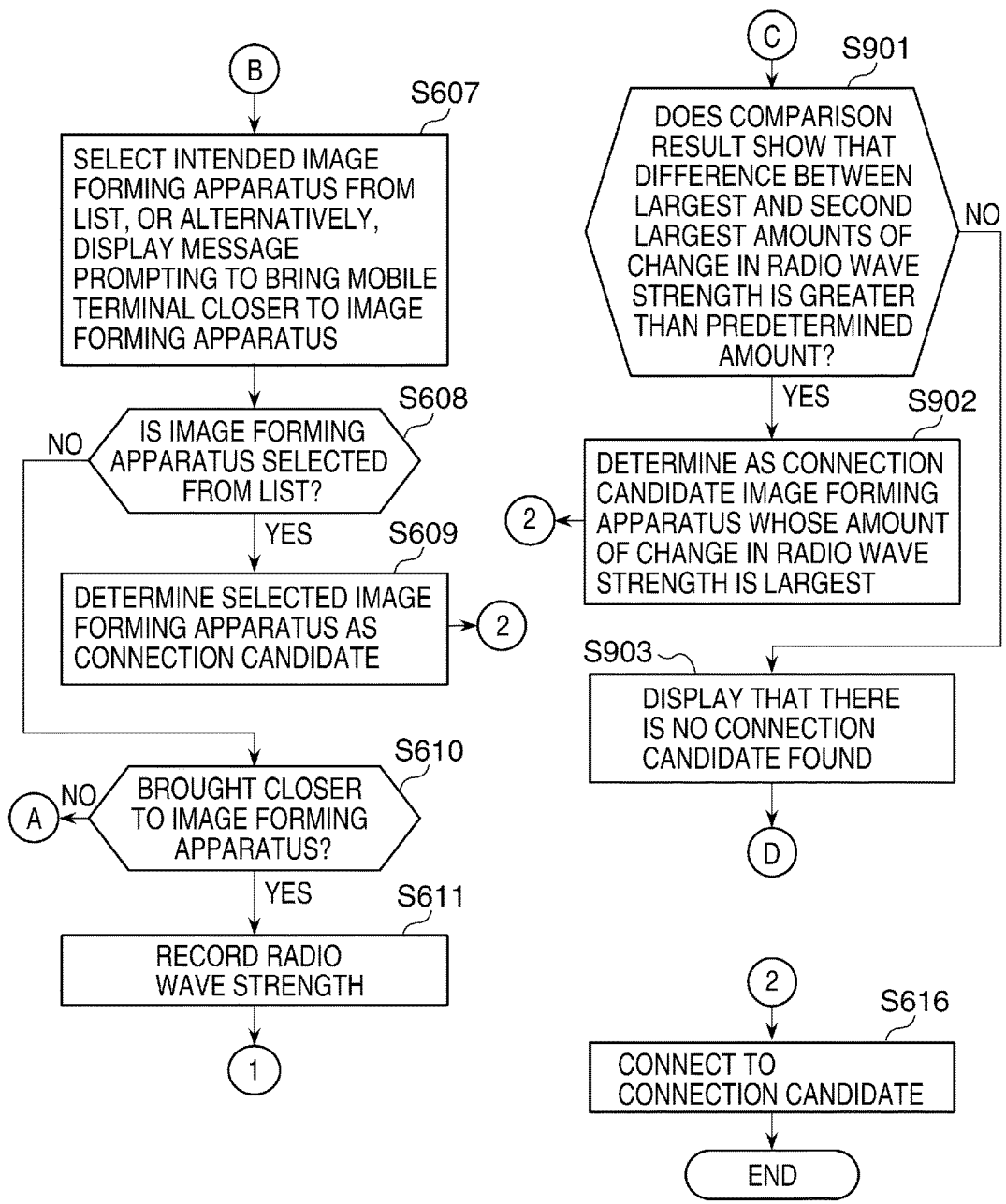

FIG. 9A and FIG. 9B are flowcharts showing procedures of another image forming apparatus determination process performed on the mobile terminal 130 of FIG. 3.

With reference to FIG. 9A, the CPU 301 determines whether the difference between the largest and next (second) largest amounts of change in radio wave strength in the comparison in step S614 is larger than a predetermined amount (step S901). The predetermined amount is 10 dBm, for example. If the result of the determination in step S901 shows that the largest amount of change in radio wave strength is larger than the second largest amount of change in radio wave strength by the predetermined amount (step S901: YES), the CPU 301 advances the process to step S902. In step S902, the CPU 301 determines as the connection candidate the image forming apparatus sending the radio wave corresponding to the largest amount of change in strength of radio wave. Then, the CPU 301 advances the process to step S616. On the other hand, if the result of the determination in step S901 shows that the difference between the largest and second largest amounts of change in radio wave strength is smaller than the predetermined amount (step S901: NO), the CPU 301 advances the process to step S903. In step S903, the CPU 301 displays, on the operation unit 307, a message saying that the image forming apparatus as the connection candidate was not found. Thus, the CPU 301 returns the process to step S602.

According to the above-described process of FIG. 9A and FIG. 9B, in the case that the largest amount of change in radio wave strength is larger than the second largest amount of change in radio wave strength by the predetermined amount, the image forming apparatus sending the radio wave corresponding to the largest amount of change in radio wave strength is determined as the connection candidate. Therefore, even in an installation environment in which a plurality of image forming apparatuses are closely disposed in such a manner that there are a plurality of radio waves having similar amounts of change in strength, it is possible to perform pairing with an image forming apparatus only if there is a sufficient amount of change in strength. With this arrangement, for example, it is surely prevented that a connection is mistakenly made with an image forming apparatus to which connection is not intended and which is adjacent to the image forming apparatus to which connection is intended.

In the first and second embodiments, at the time when the mobile terminal 130 gets connected to the image forming apparatus 100, it is not confirmed to the user whether the connection is approved. In contrast to that arrangement, in the third embodiment, a confirmation to the user is made. It should be noted that in the present embodiment, the same parts as in the above first and second embodiments are assigned the same reference symbols and will not be described again, and only the points different from those in the above first and second embodiments will be described.

Figure 10:
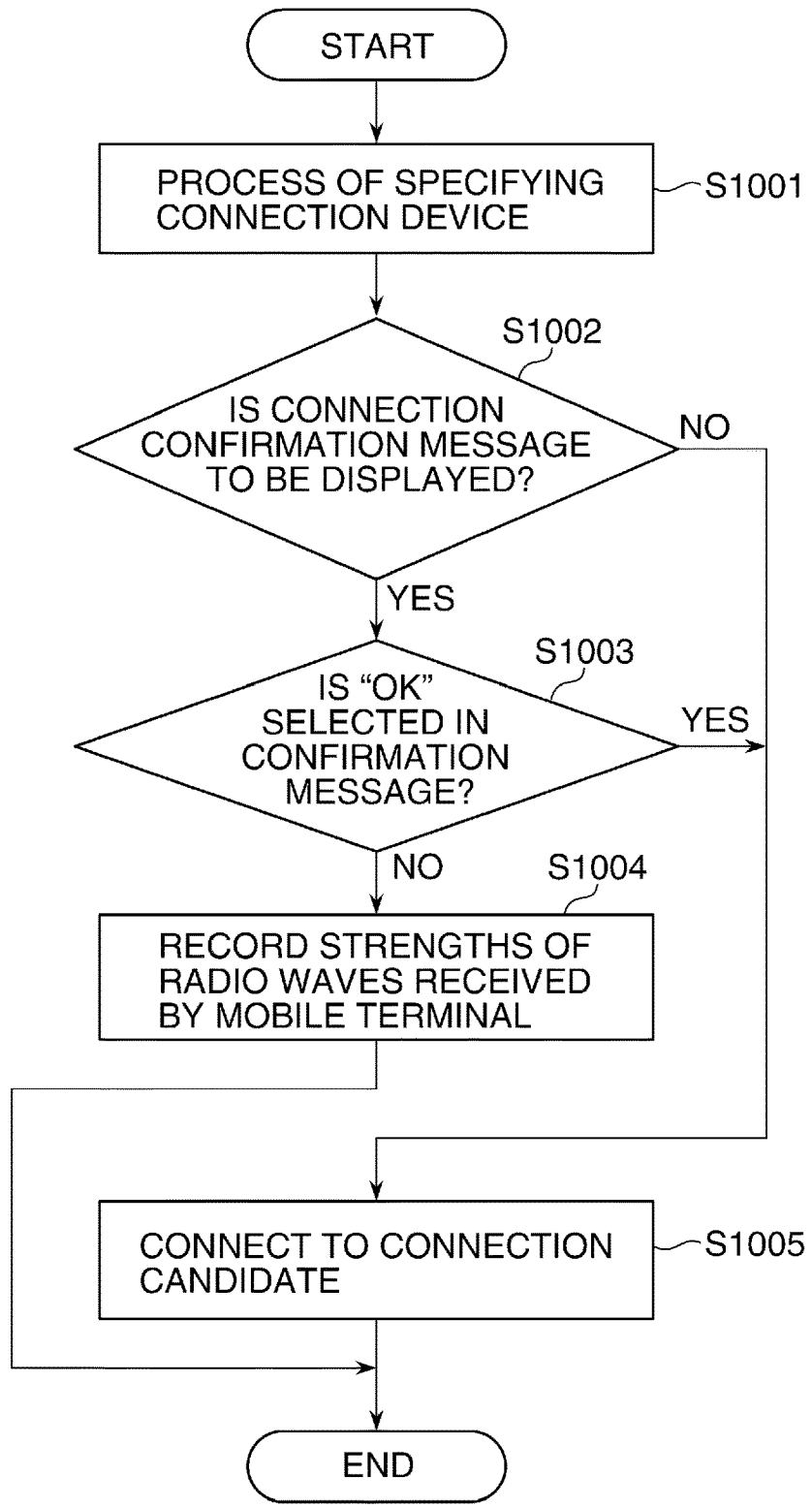
FIG. 10 is a flowchart showing connection confirmation procedures performed on the mobile terminal of FIG. 3 for connecting to the image forming apparatus.

FIG. 10 is a flowchart showing procedures in a case that a connection confirmation message is displayed in an image forming apparatus determination process performed by the mobile terminal 130.

Figure 11:
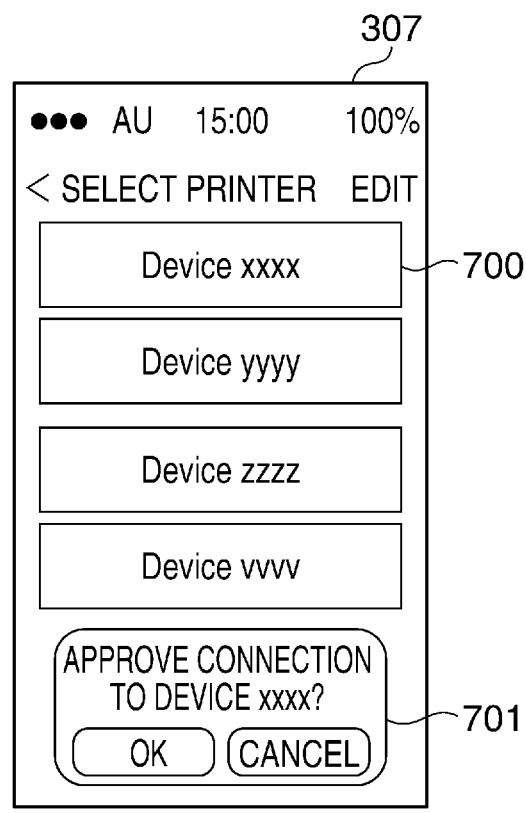
FIG. 11 is a diagram showing an example of a connection confirmation message displayed on the operation unit of the mobile terminal before the mobile terminal connecting to the image forming apparatus determined as a connection candidate.

With reference to FIG. 10, the CPU 301 first determines the image forming apparatus as the connection candidate by performing steps S601 to S615 in FIG. 6A and FIG. 6B or steps S601 to S614 and S901 to S903 in FIG. 9A and FIG. 9B (step S1001). Then, the CPU 301 determines whether to display a connection confirmation message 1101 (FIG. 11) on the operation unit 307 to confirm whether it is acceptable to connect to the image forming apparatus as the connection candidate determined in step S1001 (step S1002). It is previously set by the user on the mobile terminal 130 whether the connection confirmation message 1101 is displayed. If the result of the determination in step S1002 shows that the connection confirmation message 1101 is to be displayed (step S1002: YES), the CPU 301 displays the connection confirmation message 1101 on the operation unit 307 and advances the process to step S1003. On the other hand, if the connection confirmation message 1101 is not to be displayed (step S1002: NO), a connection is made to the image forming apparatus as the connection candidate determined in step S1001 (step S1005), and the present process is finished. Then, in step S1003, the CPU 301 determines whether an OK button is selected by the user on the connection confirmation message 1101. If the result of the determination in step S1003 shows that the OK button is selected (step S1003: YES), the CPU 301 makes a connection to the image forming apparatus as the connection candidate (step S1005), and then the present process is finished. On the other hand, if the result of the determination in step S1003 shows that the OK button is not selected (a cancel button is selected) (step S1003: NO), the CPU 301 returns the process to step S602 in FIG. 6A. Then, the CPU 301 records the strengths of the received radio waves in the RAM 303 (step S1004), and then the process is finished.

According to the above-described process of FIG. 10, before connecting to the image forming apparatus which is previously determined as the connection candidate, the connection confirmation message 1101 is displayed, on the operation unit 307, to ask the user for a confirmation about the connection to the image forming apparatus. By this method, it is prevented to mistakenly connect to the image forming apparatus to which connection is not intended.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-214567, filed Oct. 30, 2015 which is hereby incorporated by reference herein in its entirety.

What is claimed is:

1. A mobile terminal comprising:
   a communicator that receives a Bluetooth Low Energy (BLE) radio wave;
   a memory device that stores a program; and
   at least one processor that executes the program to:
   search for a plurality of image forming apparatuses to be displayed in a list, based on an intensity of the BLE radio wave received by the communicator from each of the plurality of image forming apparatuses and a first predetermined value;
   display a screen containing both the list of the plurality of image forming apparatuses of which the intensity of the BLE radio wave received by the communicator from each of the plurality of image forming apparatuses is greater than the first predetermined value and a prompting message that prompts to a user of the mobile terminal to bring the mobile terminal closer to an image forming apparatus among the plurality of image forming apparatuses displayed in the list;

specify, based on (i) an intensity of the BLE radio wave further received by the communicator from each of the plurality of image forming apparatuses while displaying the screen containing both the list and the prompting message and (ii) a second predetermined value being different from the first predetermined value, one image forming apparatus, to which the mobile terminal has been brought closer than when the list was first displayed and which has been located within a predetermined distance from the mobile terminal, from the plurality of image forming apparatuses contained in the list, without receiving, from the user prompted by the prompting message, any operation through the screen displaying the list; and connect to the specified one image forming apparatus.

2. The mobile terminal according to claim 1, wherein the mobile terminal receives the BLE radio wave from each of the plurality of image forming apparatuses, and the at least one processor executes the program to specify, based on an amount of change in radio wave strength of each of the received BLE radio waves, the one image forming apparatus to which the mobile terminal has been brought closer.

3. The mobile terminal according to claim 2, wherein the at least one processor executes the program to specify, as the one image forming apparatus to which the mobile terminal has been brought closer, an image forming apparatus of which the amount of change in radio wave strength is largest.

4. The mobile terminal according to claim 1, wherein in a case where a user selects one image forming apparatus from the plurality of image forming apparatuses displayed in the list, the at least one processor executes the program to connect to the image forming apparatus selected by the user.

5. The mobile terminal according to claim 1, wherein when a plurality of image forming apparatuses are found by the search, the at least one processor executes the program to display the list, and when one image forming apparatus is found by the search, the at least one processor executes the program to connect to the found image forming apparatus without displaying the list.

6. The mobile terminal according to claim 1, wherein when a radio wave strength of the BLE radio wave received by the mobile terminal from an image forming apparatus is greater than a predetermined radio wave strength, the at least one processor executes the program to display the image forming apparatus in the list.

7. The mobile terminal according to claim 1, wherein the at least one processor executes the program to search for an image forming apparatus by using BLE communication.

8. The mobile terminal according to claim 1, wherein a device name of an image forming apparatus is displayed in the list.

9. The mobile terminal according to claim 1, wherein a radio wave strength of the BLE radio wave received by the mobile terminal from an image forming apparatus is displayed in the list.

10. The mobile terminal according to claim 1, wherein:

in a case where the intensity of the further received BLE radio wave from any image forming apparatus among the plurality of image forming apparatuses is greater, by at least a threshold amount, than intensities of the further received BLE radio waves from all remaining image forming apparatuses of the plurality of image forming apparatuses, the mobile terminal specifies and connects to the any image forming apparatus among the plurality of image forming apparatuses, and in a case where the intensity of the further received BLE radio wave from any image forming apparatus among the plurality of image forming apparatuses is not greater, by at least the threshold amount, than the intensities of the further received BLE radio waves from all remaining image forming apparatuses of the plurality of image forming apparatuses, the mobile terminal specifies and connects to an image forming apparatus based on an amount of change in radio wave strength that is determined using the further received BLE radio waves.

11. A control method for a mobile terminal having a communicator that receives a Bluetooth Low Energy (BLE) radio wave, comprising:

searching for a plurality of image forming apparatuses to be displayed in a list, based on an intensity of the BLE radio wave received by the communicator from each of the plurality of the image forming apparatuses;

displaying, after the searching, a screen containing both a prompting message that prompts a user of the mobile terminal to bring the mobile terminal closer to an image forming apparatus among the plurality of image forming apparatuses and the list of the plurality of image forming apparatuses obtained by the searching;

specifying, based on an intensity of the BLE radio wave further received by the communicator from at least one of the image forming apparatuses while displaying the screen including the list, one image forming apparatus to which the mobile terminal has been brought closer than when the list was first displayed and which has been located within a predetermined distance from the mobile terminal, from the plurality of image forming apparatuses contained in the list, without receiving, from the user prompted by the prompting message, any operation through the list being displayed; and connecting to the specified one image forming apparatus.

12. The control method according to claim 11, wherein the BLE radio waves are received from the plurality of image forming apparatuses, and in the specifying, the one image forming apparatus to which the mobile terminal has been brought closer is specified based on amounts of change in radio wave strength of the received BLE radio waves.

13. The control method according to claim 12, wherein in the specifying, an image forming apparatus of which the amount of change in radio wave strength is largest is determined as the one image forming apparatus to which the mobile terminal has been brought closer.

14. The control method according to claim 11, wherein in a case where one image forming apparatus is selected by a user from the plurality of image forming apparatuses displayed in the list, a connection is made to the image forming apparatus selected by the user.

15. The control method according to claim 11, wherein when a plurality of image forming apparatuses are found in the searching, the list is displayed, and when one image forming apparatus is found in the searching, a connection is made to the found image forming apparatus without displaying the list.

16. The control method according to claim 11, wherein in the displaying, when a radio wave strength of the BLE radio wave received by the mobile terminal from an image forming apparatus is greater than a predetermined radio wave strength, the image forming apparatus is displayed in the list.

17. The control method according to claim 11, wherein in the searching, BLE communication is used to search for an image forming apparatus.

18. The control method according to claim 11, wherein in the list, a device name of an image forming apparatus is displayed.

19. The control method according to claim 11, wherein in the list, a radio wave strength of the BLE radio wave received by the mobile terminal from an image forming apparatus is displayed.

20. A control method for a mobile terminal that performs a wireless communication according to a first wireless communication standard and a wireless communication according to a second wireless communication standard, the control method comprising:
   receiving a wireless signal of the first wireless communication standard from each of a plurality of image forming apparatuses;
   measuring and storing an intensity of the received wireless signal of the first wireless communication standard for each of the plurality of image forming apparatuses;
   receiving again a wireless signal of the first wireless communication standard from each of the plurality of image forming apparatuses and measuring an intensity of the received-again wireless signal of the first wireless communication standard; and
   selecting one image forming apparatus, as an image forming apparatus for communicating with the mobile terminal according to the second wireless communication standard, from among the plurality of image forming apparatuses based on the measured and stored intensity of the received wireless signal of the first wireless communication standard for each of the plurality of image forming apparatuses and the measured intensity of the received-again wireless signal of the first wireless communication standard for each of the plurality of image forming apparatuses.

21. The control method according to claim 20, wherein the selecting includes:
   calculating a difference between the measured intensity of the received-again wireless signal and the measured and stored intensity of the received wireless signal for each of the plurality of image forming apparatuses; and
   selecting the one image forming apparatus for which the calculated difference of intensity of the wireless signals is the greatest among the plurality of image forming apparatuses, based on the difference calculated for each of the plurality of image forming apparatuses.

22. The control method according to claim 20, further comprising:
   displaying a screen that includes both of a list of names of the plurality of image forming apparatuses and a message to prompt a user to bring the mobile terminal closer to an image forming apparatus, according to a reception of the wireless signal of the first wireless communication standard.

23. The control method according to claim 22, wherein the displayed screen includes indicators that respectively indicate the intensities of the wireless signals of the first wireless communication received from the plurality of image forming apparatuses.

24. The control method according to claim 20, wherein the first wireless communication standard is BLE (Bluetooth Low Energy), and
   the second wireless communication standard is WiFi.

25. The control method according to claim 20, wherein, for each of the plurality of image forming apparatuses, the measuring of the intensity of the received wireless signal measures the intensity of the received wireless signal of the first wireless communication standard based on the received wireless signal of the first wireless communication standard.

* * * * *